(12) United States Patent
Benkert et al.

(10) Patent No.: US 11,224,949 B2
(45) Date of Patent: Jan. 18, 2022

(54) DEVICES AND METHOD FOR MACHINING A WORKPIECE

(71) Applicant: TECHNISCHE UNIVERSITÄT MÜNCHEN, Munich (DE)

(72) Inventors: Tim Benkert, Münich (DE); Martin Feistle, Burgau (DE); Thomas Kopp, Eching (DE); Roland Golle, Erding (DE)

(73) Assignee: Technische Universität München, Munich (DE)

( * ) Notice: Subject to any disclaimer, the term of this patent is extended or adjusted under 35 U.S.C. 154(b) by 296 days.

(21) Appl. No.: 16/323,100

(22) PCT Filed: Jul. 26, 2017

(86) PCT No.: PCT/EP2017/068824
§ 371 (c)(1),
(2) Date: Feb. 4, 2019

(87) PCT Pub. No.: WO2018/024554
PCT Pub. Date: Feb. 8, 2018

(65) Prior Publication Data
US 2019/0160615 A1 May 30, 2019

(30) Foreign Application Priority Data

Aug. 5, 2016 (EP) .................... 16183048

(51) Int. Cl.
*B23Q 3/06* (2006.01)
*B30B 15/06* (2006.01)
*F15B 7/06* (2006.01)

(52) U.S. Cl.
CPC .............. *B23Q 3/069* (2013.01); *B30B 15/06* (2013.01); *B30B 15/062* (2013.01); *B30B 15/065* (2013.01); *F15B 7/06* (2013.01)

(58) Field of Classification Search
CPC . B25B 11/00; B25B 1/00; B23P 11/00; B23Q 3/069; B30B 15/06; B30B 15/062; B30B 15/065
(Continued)

(56) References Cited

U.S. PATENT DOCUMENTS 4,030,391 A * 6/1977 Swanson ................ B21D 28/24
83/137
4,321,818 A 3/1982 Bessho
(Continued)

FOREIGN PATENT DOCUMENTS

FR 2487703 2/1982
FR 2487703 A1 * 2/1982 ........... B21D 45/006
GB 2053364 2/1981

OTHER PUBLICATIONS

FR-2487703-A1 Machine Translation (Year: 1982).*
(Continued)

*Primary Examiner* — Lee D Wilson
*Assistant Examiner* — Alberto Saenz
(74) *Attorney, Agent, or Firm* — Sunstein LLP

(57) ABSTRACT

The invention relates to a speed-changing shearing or forming active element insert which is designed to be detachably connected to an active element receptacle of a machine tool, the speed-changing shearing or forming active element insert having a speed-changing unit which is in the form of a hydraulic force/distance transducer, the force/distance transducer comprising a housing, the housing interior of which is supplied with a hydraulic fluid, and the force/distance transducer comprising a first piston which is in oo contact with the hydraulic fluid via one piston end and a second piston which is in contact with the hydraulic fluid via one piston end and the cross-sectional area of which is smaller than the cross-sectional area of the first piston. The (Continued)

invention also relates to the use of the speed-changing changing shearing or forming active element insert in a machine tool.

8 Claims, 3 Drawing Sheets

(58) Field of Classification Search
USPC ............ 269/24, 25, 27, 32, 55, 71; 29/281.1
See application file for complete search history.

(56) References Cited

U.S. PATENT DOCUMENTS

| | | | | |
|---|---|---|---|---|
| 4,409,720 | A * | 10/1983 | Boudreau | B30B 1/32 |
| | | | | 29/243.5 |
| 7,555,901 | B2 * | 7/2009 | Dantlgraber | B26D 5/12 |
| | | | | 60/534 |
| 2002/0104207 | A1 | 8/2002 | Smith | |
| 2007/0084357 | A1 | 4/2007 | Dantlgraber | |

OTHER PUBLICATIONS

Tom Barthel et al., *Entwicklung kalkulatorischer Kenngrößen zur Gestaltung von Scherschneidprozessen und Berwertung der Bauteilqualität bei Anwendung hoher Schneidgeschwindigkeiten*, Final Report, dated Nov. 2, 2012, Chapter 2.2, pp. 11-17 (with English trnaslation).

Peter Michael Demmel, In-situ *Temperaturmessung beim Scherschneiden*, Dissertation, Jan. 14, 2014, Chapter 9.4.2, pp. 102 and 103 (with English translation).

Eckart Doege et al., *Handbuch Umformechnik*, Springer-Verlag Berlin Heidelberg, 2010, ISBN 978-3-642-04248-5, pp. 754 and 866 (with English translation).

Martin Hindersmann, *Entwicklung und Einsatz von Pressenanrtrieben mit unrunden Zahnrädern*, VDI Verlag, 1998, ISBN 3-18-330401-5, Chapter 6.1.1, pp. 72-74 (with English translation).

Klaus-Peter Groß et al., *Adiabatic Cutting on Automatic Punchung Machines*, Blech Rohre Profile of umformtechnik.net, Apr. 2013, 4 pages (with English translation).

R. Neugebauer et al., *High-speed shear cutting finds its way into sheet metal processing*, wt Werkstattstechnik online, vol. 98, 2008, pp. 813-814 (with English translation).

Dieter Schmoeckel et al., *Improvement the cutting part quality through high-speed shear cutting*, Steel, Issue No. 43, 1992, pp. 29-32 (with English translation).

*Hydraulic system*, ibKastl GmbH Wiki; https://ibkastl.de/wiki/Hydraulik, Jun. 11, 2014, 3 pages (with English translation).

Benkert et al., *Designing a High-Speed Press with a Six-Bar Linkage Mechanism*, Applied Mechanics and Materials, vol. 794 (2015) pp. 411-418.

Grünbaum et al., *Influence of High Cutting Speeds on the Quality of Blanked Parts*, NSF Engineering Research Center for Net Shap Manufacturing, The Ohio State University, Report No. ERC/NSM-S-96-19, May 1996, 114 pages.

Krinninger et al., *Experimental investigation of the influence of punch velocity on the springback behavior and the flat length in free bending*,Procedia CIRP 41(2016) 1066-1071.

Seth et al., *Formability of steel sheet in high velocity impact*, Journal of Materials Processing Technology 168 (2005) pp. 390-400

Verleysen et al., *Effect of strain rate on the forming behaviour of sheet metals*, Journal of Maaterials Processing Technology 211 (2011), pp. 1457-1464.

Volk et al., *Evaluation of Experiment Forming Limit Curves and Investigation of Strain Rate Sensitivity for the Start of Locak Necking*, The 8th International Conference and Workshop on Numerical Simulation of 3D Sheet Metal Forming Processes AIP Conf. Proc. 1383, (2011), pp. 99-106.

The International Bureau of WIPO, English translation of International Preliminary Report on Patentability, PCT/EP2017/068824; dated Feb. 5, 2019, 12 pages.

International Searching Authority—EPO, International Search Report, PCT/EP2017/068824; dated Feb. 13, 2018, 12 pages.

* cited by examiner

DEVICES AND METHOD FOR MACHINING A WORKPIECE

CROSS-REFERENCE TO RELATED APPLICATIONS

This Application is a U.S. national stage entry under 35 USC § 371 of Patent Cooperation Treaty Application PCT/EP2017/068824, filed Jul. 26, 2017, which claims priority from European Patent Application 16183048.4, filed Aug. 5, 2016, both of which are incorporated herein by reference in their entireties.

FIELD OF THE INVENTION

The present invention relates to the field of mechanical machining of a workpiece using a machine tool.

BACKGROUND

In the mechanical machining of a workpiece with a machine tool, multiple processing steps are often performed in parallel to increase throughput of the workpiece. Thus, for example in the machining of a workpiece with active elements, several shear-cutting and forming steps are performed in one motion cycle by an active element holder of a machine tool being fitted with a plurality of active elements, which are then moved towards the workpiece in a single movement.

The guiding of various active elements towards the workpiece in one movement, however, can also involve disadvantages, in as much as different processing methods often place different requirements on the motion sequence of the respective active element, which can often lead to an unsatisfactory compromise between conflicting requirements.

SUMMARY

These and other disadvantages are overcome by a machine tool according to the invention, a speed translating, shear-cutting or deforming active element insert according to the invention, and a method according to the invention.

The machine tool according to the invention comprises a first active element, a first active element receptacle, a drive unit, which is functionally connected to the first active element receptacle and which is configured to move the first active element receptacle towards the first active element relative to a workpiece in a first phase of a motion cycle and away from the first active element in a second phase of the motion cycle, and at least one speed translation unit, having a first and a second connection means, wherein the first connection means is connected to the first active element receptacle and the second connection means forms a second active element receptacle, wherein the at least one speed translation unit is designed as a hydraulic force/distance transducer.

The term "motion cycle" in this context is to be understood to mean that, by means of a guide provided in the machine tool, a movement of the first active element receptacle is defined, which starts from an initial state at the beginning of the motion cycle and ends at this position again at the end of the motion cycle, wherein the end of the motion cycle is typically directly followed by another motion cycle. During the first phase of the motion cycle, the workpiece is machined by active elements and is then exchanged for the next workpiece to be processed between first phases of successive motion cycles. In addition, the term "speed translation unit" is to be understood in a broad sense, as being a unit which translates a drive speed into an output drive speed which is different from the drive speed. In addition, this is intended to comprise both the possibility of an active element which is detachably connected to the second active element receptacle as well as an active element which is fixedly connected to the second active element receptacle.

The use of a hydraulic force/distance transducer enables an active-element-specific force/speed translation. In addition, by selecting the compressibility of the hydraulic fluid, a force acting on the workpiece can be damped. In addition, vibrations originating in cyclic processes can be attenuated by selecting the fluid guide in the force/distance transducer. In this context, it should also be mentioned that the term "hydraulic fluid" is to be understood in a broad sense and can also include a composite or a mixture of different hydraulic fluids.

The at least one speed translation unit is preferably configured to reduce or increase a maximum relative speed between the second active element receptacle and the first active element during the first phase of the movement cycle in comparison to a maximum relative speed between the first active element receptacle and the first active element during the first phase of the motion cycle.

The speed translation unit therefore enables the speed with which an active element that is attached to the second active element receptacle is moved towards the workpiece to be reduced or increased in comparison to the speed with which the active element would be moved towards the workpiece if it were attached to the first active element receptacle. By reducing the speed, for example, the quality of the geometry applied during the forming process can be improved. By increasing the speed, for example, the quality of the cut surface during a shearing process can be improved.

Preferably, the force/distance transducer comprises a housing, the housing interior of which is pressurised with a hydraulic fluid, a preferably cylindrical first piston in contact with the hydraulic fluid via a piston end, and a preferably cylindrical second piston, arranged coaxially to the first piston, which is in contact with the hydraulic fluid via a piston end and the cross-sectional area of which is smaller than the cross-sectional area of the first piston.

Thus, the speed translation unit can be fastened directly to the first active element receptacle by means of a piston as the first connection means, since the coaxial arrangement of the pistons prevents lever forces from acting on the pistons during the machining of the workpiece.

The machine tool is preferably configured for machining a metal workpiece and preferably for machining a semi-finished product, particularly preferably a metal sheet, in particular a steel plate.

This allows a plurality of different processing steps, for example cutting and forming, to be combined in a machine tool in one process step without having to accept any loss of quality due to the different requirements on the active element speeds or having to perform the steps sequentially, which would cause a reduced throughput of workpieces.

The machine tool is preferably designed as a forming machine tool.

This allows, for example, a cutting process requiring fast active element speeds to be combined with a forming process requiring slower active element speeds in a machine tool in a concurrently executed process step, initiated by the movement of a common active element receptacle.

The speed-translating shearing or forming active element insert according to the invention is configured to be detachably connected to an active element receptacle of a machine tool, wherein the speed-translating shearing or forming active element insert has a speed translation unit, which is designed as a hydraulic force/distance transducer, wherein the force/distance transducer comprises a housing, the housing interior of which is pressurised with a hydraulic fluid, and the force/distance transducer comprises a first piston, which is in contact with the hydraulic fluid via one piston end, and a second piston, which is in contact with the hydraulic fluid via one piston end and the cross-sectional area of which is smaller than the cross-sectional area of the first piston.

Due to the detachable connection between the shearing or forming active element insert and active element receptacle, the shearing or forming active element insert can be exchanged for other shearing or forming active element inserts with a different speed translation, allowing the active element speed to be adjusted to suit different workpieces and machining techniques.

Preferably, the first piston and the second piston are cylindrical pistons, which are coaxially arranged.

The coaxial arrangement enables the speed translation unit to be mounted directly on the active element receptacle of the machine tool by means of a piston, since the coaxial arrangement of the pistons prevents lever forces from acting on the pistons during the machining of the workpiece. In addition, the symmetry also allows the shearing or forming active element insert to be turned through 180° when refitting, which allows a selection to be made (depending on the workpiece) between a reduction and an increase in the relative speed between the active elements.

Preferably, the first or the second piston is configured to be detachably connected to the active element receptacle of the machine tool, and the remaining piston comprises a shearing or forming stamp.

For example, one end of a piston can be designed as a shearing or forming stamp or can have a shearing or forming stamp which is detachably connected to the piston.

The method according to the invention comprises processing a workpiece, which is arranged between a first active element and a plurality of second active elements of a machine tool, wherein a first of the second active elements is moved against the workpiece in a motion cycle with a first speed relative to the first active element and a second of the second active elements is moved against the workpiece in a motion cycle with a second speed relative to the first active element, and wherein the first speed and the second speed are different.

This allows a plurality of different processing methods to be used at the same time in one processing step, without any loss of quality having to be accepted due to the different requirements of the active element speed.

Preferably, the workpiece is perforated with the first of the second active elements, and plastically formed with the second of the second active elements.

In this case, the first of the second active elements can be moved relative to the workpiece at a higher speed than the second of the second active elements, which allows, for example, the burr formation during the shearing to be reduced, without compromising the quality of the forming of the workpiece by the second of the second active elements.

Preferably, the first of the second active elements is connected to a hydraulic force/distance transducer, which comprises a housing, the housing interior of which is pressurised with a hydraulic fluid, and the force/distance transducer comprises a first piston, which is in contact with the hydraulic fluid via one piston end, and a second piston, which is in contact with the hydraulic fluid via one piston end and the cross-sectional area of which is smaller than the cross-sectional area of the first piston.

The use of a hydraulic force/distance transducer allows the force acting on the workpiece to be attenuated by selection of the hydraulic fluid and any vibrations emerging during cyclic processes to be damped by suitable choice of the fluid guide in the force/distance transducer.

Preferably, the first piston and the second piston are arranged coaxially, and the first piston and the second piston are particularly preferably cylindrical in shape.

A piston of the force/distance transducer can therefore be mounted directly on an active element receptacle of the device, since the coaxial arrangement of the pistons prevents lever forces from acting on the pistons during the machining of the workpiece.

The workpiece preferably consists of metal.

The workpiece is preferably designed as a semi-finished product, preferably as sheet metal, in particular as a steel sheet.

BRIEF DESCRIPTION OF THE DRAWINGS

The invention is described below in the detailed description on the basis of exemplary embodiments, with reference to the drawings which show.

The same elements in the drawings are labelled with identical reference numerals and analogous elements by reference numerals with an apostrophe added, but which are otherwise identical.

DETAILED DESCRIPTION

Figure 1:
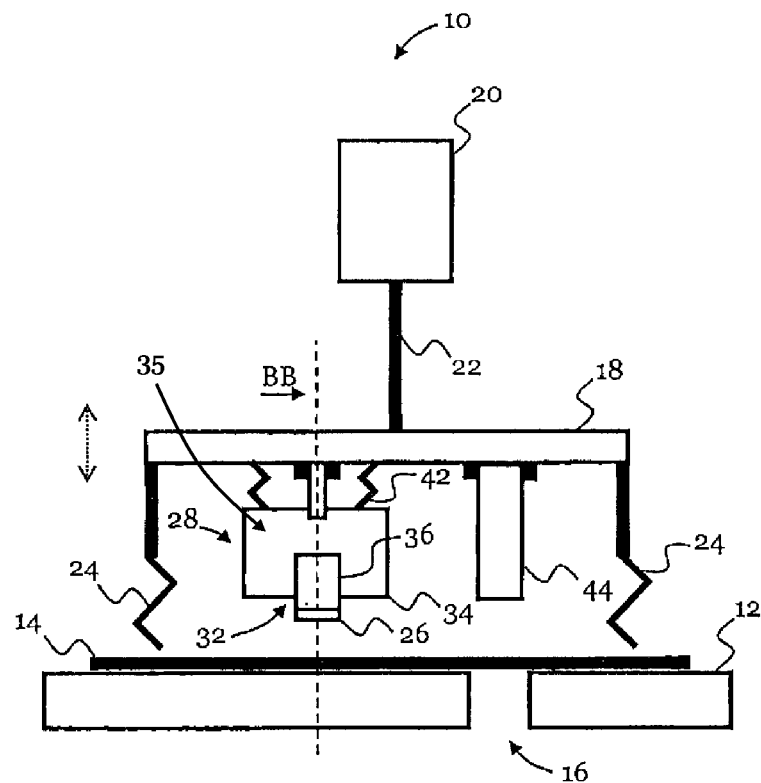
FIG. 1 a schematic longitudinal section of a first machine tool according to a first preferred embodiment of the present invention.
Figure 2:
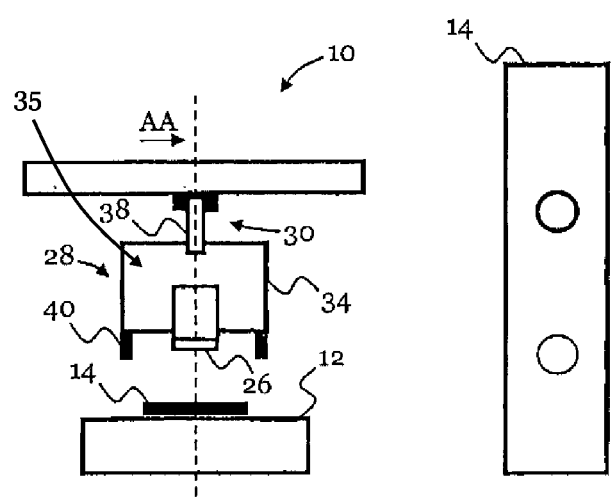
FIG. 2 a schematic cross section of the first machine tool and a plan view of a first workpiece machined by the first machine tool.

FIGS. 1 and 2 show a schematic longitudinal section and a schematic cross section of a first machine tool 10 according to a first preferred embodiment of the present invention along the sectional planes AA or BB. The machine tool 10 comprises a first active element 12 (hereafter also referred to as a workpiece support), on which a flat first workpiece 14 is arranged. The workpiece support 12 has a cutout 16. Above the workpiece support 12, a first active element receptacle 18 is arranged. The first active element receptacle 18 is in functional connection with a drive unit 20. The drive unit 20 comprises a crank drive (not shown) and a connecting rod 22, which is connected to the crank drive via a connecting rod bearing (not shown). The connecting rod 22 converts the circular motion of the crank drive into a linear motion of the active element receptacle 18 (indicated in FIG.

1 by a dashed arrow). In this context, it should also be noted that instead of a crank drive with flywheel, other drive designs can be implemented in the drive unit, for example a high-torque torque motor or a hydraulic cylinder.

The drive unit 20 is configured to move the first active element receptacle 18 relative to the workpiece support 12 towards the first workpiece 14 in a first phase of a motion cycle and away from the workpiece support 12 in a second phase of the motion cycle. When the first active element receptacle 18 is moved towards the workpiece support 12, the retaining elements 24 come to rest on the workpiece 14, which causes the workpiece 14 to be pressed against the workpiece support 12 so that the resulting force fit between the workpiece 14 and the workpiece support 12 holds the workpiece 14 in a predetermined position in a subsequent active machining of the workpiece 14.

Between a second active element 26, which comes into direct contact with the workpiece 14 during the machining of the first workpiece 14, and the first active element receptacle 18, a speed translation unit is arranged, which couples the second active element 26 to the first active element receptacle 18. The speed translation unit 28 has a first connection means 30 and a second connection means 32, wherein the first connection means 30 is connected to the first active element receptacle 18 and the second connection means 32 forms a second active element receptacle, to which the second active element 26 is fastened.

The speed translation unit 28 is configured to reduce a maximum relative speed between the second active element receptacle and the workpiece support 12 during the active machining of the workpiece 14 (compared to a maximum relative speed between the first active element receptacle 18 and the workpiece support 12 during the active machining of the workpiece 14).

As shown in FIGS. 1 and 2, the speed translation unit 28 is designed as a hydraulic force/distance transducer, although it should be noted that other speed translation designs can also be implemented, for example speed translation designs based on mechanical transmissions, such as geared transmissions. The hydraulic force/distance transducer comprises a housing 34, the housing interior 35 of which is pressurized with a hydraulic fluid (or a mixture of different hydraulic fluids). The housing 34 also has a first cutout, in which a first piston 36 is arranged, which is in contact with the hydraulic fluid via one end of the first piston 36. The housing 34 additionally has a second cutout, in which a second piston 38 is arranged, which is in contact with the hydraulic fluid via one end of the second piston 38. The first piston 36 is arranged coaxially with respect to the second piston 38, the cross-sectional area of which is less than the cross-sectional area of the first piston 36.

Also mounted on the housing 34 of the hydraulic force/distance transducer is a spacer element 40, which is configured to limit the movement of the housing 34 in the direction of the workpiece support 12, before the second active element 26 comes into contact with the workpiece 14 and actively machines the latter. Also mounted on the housing 34 of the hydraulic force/distance transducer is an elastic return element 42, which is configured to hold the housing 34 at a definite distance from the first active element receptacle 18, or to place the housing 34 at the definite distance from the first active element receptacle 18. As an alternative to the spacer element 40 and the elastic return element 42, the housing 34 can also be directly connected to the frame of the machine tool 10, e.g. by means of circumferential stepped pieces (not shown) on the outside of the housing 34, such that the housing 34 of the hydraulic force/distance transducer remains, i.e. rests, in a fixed position relative to the frame during the processing of the workpiece 14.

If the first active element receptacle 18 is moved in the direction of the workpiece support 12, the spacer element 40 rests on the workpiece support 12. Due to the placement of the spacer element 40, the continued movement of the first active element receptacle 18 presses the second piston 38 into the housing 34, wherein on account of the different cross-sectional areas, however, the first piston 36 is pressed out of the housing 34 relative to the workpiece support 12 with only a reduced speed compared to the first active element receptacle 18. Therefore, the second active element 26 in the active machining phase is moved towards the workpiece 14 at a lower speed than the second active element 44, which is directly connected to the first active element receptacle 18.

After the forming of the workpiece 14 by the second active element 26 and the perforation by the second active element 44, the first active element receptacle 18 is moved away from the workpiece support 12. If the spacer element 40 lifts off the workpiece support 12, the housing 34 will return into its initial position driven by the elastic return element 42.

Figure 3:
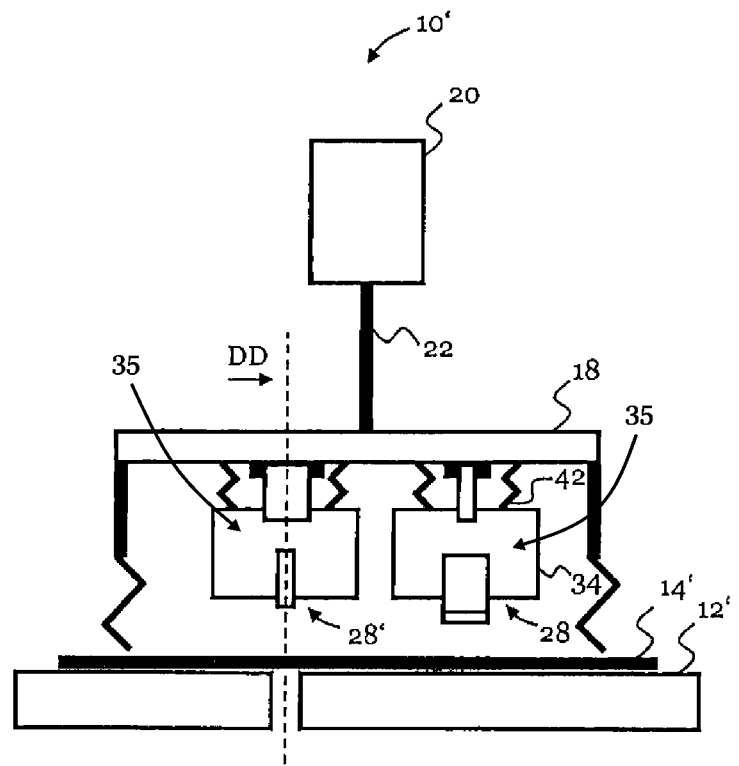
FIG. 3 a schematic longitudinal section of a second machine tool according to a second preferred embodiment of the present invention.
Figure 4:
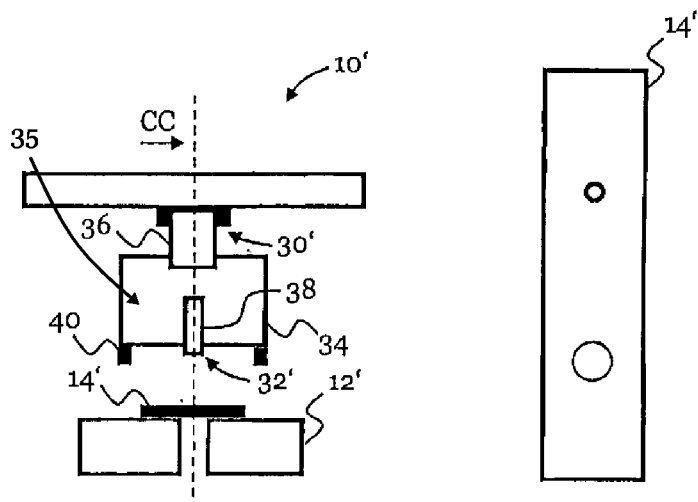
FIG. 4 a schematic cross section of the second machine tool and a plan view of a second workpiece machined by the second machine tool.

FIGS. 3 and 4 show a schematic longitudinal section and a schematic cross section of a second machine tool 10' according to a second preferred embodiment of the present invention along the sectional planes CC and DD respectively. The second machine tool 10', like the first machine tool 10, comprises the drive unit 20, the connecting rod 22 and the first active element receptacle 18. However, instead of the second active element 44, a second speed translation unit 28' is arranged on the adjustable mounting means of the first active element receptacle 18 next to the first speed translation unit 28. In this context it should be noted, however, that in other embodiments, in addition to the second active element 44 the second speed translation unit 28' can also be fastened to the first active element receptacle 18.

The design of the second speed translation unit 28' corresponds to the first speed translation unit 28, but is installed rotated by 180°, so that the first piston 36 is connected to the first active element receptacle 18 as the first connection means 30' and the second piston 38 forms a second active element receptacle as the second connection means 32', into which a further second active element is integrated. In addition, the spacer element 40 and the elastic return element 42 are mounted at corresponding positions of the second speed translation unit 28' which is rotated by 180°.

If the first active element receptacle 18 is moved in the direction of the workpiece support 12', the spacer element 40 rests on the workpiece support 12'. Due to the placement of the spacer element 40, the first piston 36 is pressed into the housing 34, wherein the second piston 36 is pressed out of the housing 34 relative to the workpiece support 12' with an increased speed compared to the first active element receptacle 18. Therefore, the additional second active element is moved towards the second workpiece 14' at a higher speed than the second active element 26 or a second active element, which would be directly connected to the first active element receptacle 18.

After the forming of the second workpiece 14' by the second active element 26 and after the perforation by the additional second active element, the first active element receptacle 18 is moved away from the workpiece support 12'. If the spacer element 40 lifts off the workpiece support 12', the housings 34 will return to their initial positions driven by the elastic return elements 42.

Figure 5:
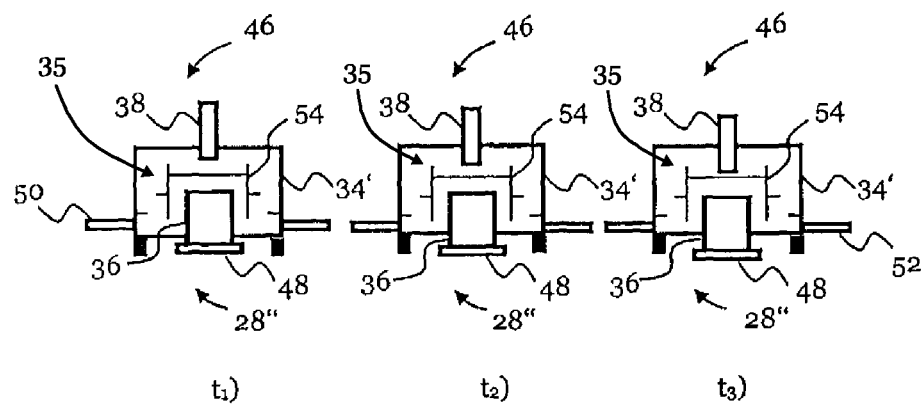
FIG. 5 a schematic cross section of a speed-translating shearing or forming active element insert that can be used in the first or second machine tool.

FIG. 5 shows a cross section of a further speed-translating shearing or forming active element insert 46, which can be used additionally or as an alternative in the first machine tool 10 or the second machine tool 10' at different times (labelled in FIG. 5 as t1 to t3) during a processing phase. The shearing or forming active element insert 46 comprises a third speed translation unit 28", which like the first speed-translating unit 28 and the second speed-translating unit 28', is designed as a hydraulic force/distance transducer.

Like the hydraulic force/distance transducer of the first speed translation unit 28 or the hydraulic force/distance transducer of the second speed translation unit 28', the hydraulic force/distance transducer of the third speed translation unit 28" comprises a housing 34', the housing interior 35 of which is pressurized with a hydraulic fluid. Analogous to the material described in connection with FIGS. 1 and 2, the housing 34' has a first cutout, in which a cylindrical first piston 36 is arranged which is in contact with the hydraulic fluid via one end of the first piston 36, and a second cutout, in which a cylindrical, second piston 38 is arranged which is in contact with the hydraulic fluid via one end of the second piston 38.

The first cylindrical piston 36 is arranged coaxially with respect to the second piston 38, the diameter of which is less than the diameter of the first piston 36. In addition, a shearing or forming stamp 48 is mounted on the first piston 36 as a second active element 26, or the first piston 36 is designed as shearing or forming stamp 48. In this context it should be noted, however, that with an installation that is rotated (by 180°), the shearing or forming stamp 48 can also be mounted on the second piston 38 and/or the second piston 38 can be designed as a shearing or forming stamp 48.

In addition, an inlet 50 and an outlet 52 are arranged on the housing 34', through which the housing interior 35 can be filled with the hydraulic fluid, and/or a hydraulic fluid located in the housing interior 35 can be replaced by a hydraulic fluid with greater or lesser compressibility, in order to adapt the damping properties of the speed translation unit 28" to different machining scenarios. In this context, it should also be noted that a supply or discharge of the hydraulic fluid can also be used to adjust or control the maximum deflection of the second active element 26 during operation. In addition, a fluid guide 54 is provided in the housing 34' which is configured to damp vibrations that emerge during cyclic processes. For example, the fluid guide 54 can form a fluid channel between the first piston 36 and the second piston 38, which has a length tuned to a processing frequency and/or a winding path which is tuned to the machining frequency.

Figure 6:
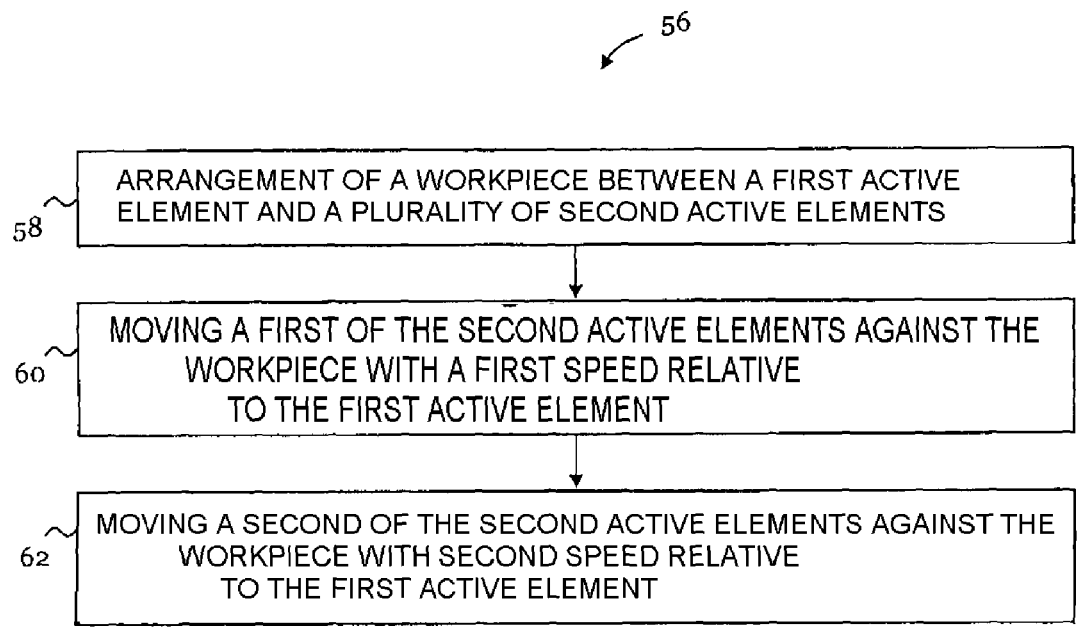
FIG. 6 a flowchart of a process for machining the workpieces.

FIG. 6 shows a flow chart of the process 56 described above for machining the workpiece 14, 14'. After the arrangement of the workpiece 14, 14' on the workpiece support 12, 12', the second active elements 26, 44 are moved towards the first or second workpiece 14, 14', e.g. a semi-finished product such as a steel sheet or another product comprising, for example copper, aluminium or stainless steel, or composite materials, plastics, natural fibres, ceramics, etc., wherein due to the use of one or more of the speed translation units 28, 28' and 28", different second active elements 26, 44 are moved towards the first or the second workpiece 14, 14' with different speeds relative to the workpiece support (matrix) 12, 12'.

In the event of a conversion of the machine tool 10, 10', one or more of the speed translation units 28, 28' and 28" can be inserted rotated by 180°, or a hydraulic fluid which is used can be replaced by a hydraulic fluid with greater or lesser compressibility in order to adapt the process 56 to different processing scenarios.

REFERENCE LIST 10, 10' machine tool
12, 12' first active element, workpiece support
14, 14' workpiece
16 recess
18 first active element receptacle
20 drive unit
22 connecting rod
24 retaining element
26 second active element
28, 28', 28" speed translation unit
30, 30' connection means
32, 32' connection means
34, 34' housing
35 housing interior
36 first piston
38 second piston
40 spacer element
42 return element
44 second active element
46 shearing or forming active element insert
48 shearing or forming stamp
50 inlet
52 outlet
54 fluid guide
56 process
58-62 process steps

The invention claimed is:
1. A machine tool, comprising:
a first active element;
a first active element receptacle;
a drive unit, which is functionally connected to the first active element receptacle and which is configured to drive the first active element receptacle towards the first active element against a workpiece in a first phase of a motion cycle and away from the first active element in a second phase of the motion cycle; and
at least one speed translation unit
wherein the at least one speed translation unit is implemented as a hydraulic force/distance transducer,
wherein the force/distance transducer comprises a housing having:
a housing interior pressurized with a hydraulic fluid,
a first piston in contact with the hydraulic fluid via an end of the first piston, and
a second piston, which is in contact with the hydraulic fluid via an end of the second piston and a cross-sectional area of which is smaller or larger than a cross-sectional area of the first piston, and
wherein the speed translation unit is fastened or detachably connectable to the first active element receptacle via the first piston and the second piston forms a second active element receptacle.

2. The machine tool according to claim 1, wherein the at least one speed translation unit is configured to reduce or increase a maximum relative speed between the second active element receptacle and the first active element during the first phase of the movement cycle in comparison to a maximum relative speed between the first active element receptacle and the first active element during the first phase of the motion cycle.

3. The machine tool according to claim 1, wherein the second piston is arranged coaxially with the first piston.

4. The machine tool according to claim 1, wherein the machine tool is configured for machining a metal workpiece.

5. The machine tool according to claim 1, wherein the first machine tool is implemented as a forming machine tool.

6. A speed-translating shearing or forming active element insert, which is adapted to be detachably connected to an active element receptacle of a machine tool, wherein the speed-translating shearing or forming active element insert has a speed translation unit, which is implemented as a hydraulic force/distance transducer, wherein the force/distance transducer comprises a housing having a housing interior pressurized with a hydraulic fluid, and the force/distance transducer comprises a first piston, which is in contact with the hydraulic fluid via an end of the first piston, and a second piston, which is in contact with the hydraulic fluid via an end of the second piston, and a cross-sectional area of which is smaller or larger than a cross-sectional area of the first piston, and wherein the speed translation unit is fastened or detachably connected to the active element receptacle via the first piston, and the second piston forms a second active element receptacle.

7. The speed-translating shearing or forming active element insert according to claim 6, wherein the first piston and the second piston are coaxially arranged, cylindrical pistons.

8. The speed-translating shearing or forming active element insert according to claim 6, wherein one of the first piston and the second piston is configured to be detachably connected to the active element receptacle of the machine tool and the remaining piston comprises a shearing or forming stamp.

* * * * *